United States Patent
Kaechi

(10) Patent No.: US 9,807,545 B2
(45) Date of Patent: Oct. 31, 2017

(54) COMMUNICATION APPARATUS CONTROLLING CLOSE PROXIMITY WIRELESS COMMUNICATION UNIT, CONTROL METHOD THEREOF AND STORAGE MEDIUM

(71) Applicant: CANON KABUSHIKI KAISHA, Tokyo (JP)

(72) Inventor: Shuya Kaechi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 14/839,807

(22) Filed: Aug. 28, 2015

(65) Prior Publication Data

US 2016/0073363 A1 Mar. 10, 2016

(30) Foreign Application Priority Data

Sep. 5, 2014 (JP) .................. 2014-181594

(51) Int. Cl.
*H04W 4/00* (2009.01)
*H04B 5/00* (2006.01)
*H04W 52/02* (2009.01)

(52) U.S. Cl.
CPC .......... *H04W 4/008* (2013.01); *H04B 5/0037* (2013.01); *H04W 52/0277* (2013.01); *H04W 52/0283* (2013.01); *H04W 52/028* (2013.01); *Y02B 60/50* (2013.01)

(58) Field of Classification Search
CPC ............. H04W 4/008; H04W 52/0277; H04W 52/028; H04W 52/0283; H04W 36/14; H04W 36/00; H04W 36/16; H04W 36/34; H04B 5/0037; Y02B 60/50
See application file for complete search history.

(56) References Cited

U.S. PATENT DOCUMENTS

| | | | |
|---|---|---|---|
| 2004/0189263 A1* | 9/2004 | Meier ..................... | H02J 7/025 323/210 |
| 2005/0156709 A1* | 7/2005 | Gilbert ................. | G06K 7/0008 340/10.1 |
| 2006/0091200 A1* | 5/2006 | Lai ....................... | G06K 7/0008 235/380 |
| 2006/0114159 A1* | 6/2006 | Yoshikawa ............. | H01Q 1/24 343/702 |
| 2007/0075140 A1* | 4/2007 | Guez ................. | G06K 19/0707 235/435 |

(Continued)

FOREIGN PATENT DOCUMENTS

EP 1936815 A2 * 6/2008 ......... G06K 7/10237
JP 2013-157736 A 8/2013

*Primary Examiner* — Devan Sandiford
(74) *Attorney, Agent, or Firm* — Cowan, Liebowitz & Latman, P.C.

(57) ABSTRACT

A communication apparatus comprises a close proximity wireless communication unit which is able to perform close proximity wireless communication with an external apparatus; a power control unit which starts control of power supply of the communication apparatus when the close proximity wireless communication unit receives electromagnetic waves from the external apparatus; and a control unit which executes shutdown processing for reducing power to each block controlled by the power control unit, wherein when the shutdown processing is executed, the control unit disables the close proximity wireless communication unit before start of the shutdown processing.

18 Claims, 11 Drawing Sheets

(56) References Cited

U.S. PATENT DOCUMENTS

| | | | |
|---|---|---|---|
| 2009/0088077 A1* | 4/2009 | Brown | H04B 5/02 455/41.2 |
| 2009/0124234 A1* | 5/2009 | Fisher | G06Q 20/32 455/406 |
| 2009/0150704 A1* | 6/2009 | Van Bosch | H04M 1/7253 713/340 |
| 2010/0022188 A1* | 1/2010 | Nakagawa | H04B 5/02 455/41.2 |
| 2010/0070783 A1* | 3/2010 | Okamoto | G06F 1/3203 713/310 |
| 2011/0198398 A1* | 8/2011 | Itay | G06K 7/10356 235/439 |
| 2012/0150601 A1* | 6/2012 | Fisher | G06Q 20/20 705/14.23 |
| 2013/0234835 A1* | 9/2013 | Piersol | G06K 19/07381 340/10.5 |
| 2014/0073244 A1* | 3/2014 | Ko | H04W 4/008 455/41.1 |
| 2014/0152417 A1* | 6/2014 | Ebeid | H01F 38/14 336/84 R |
| 2014/0220885 A1* | 8/2014 | Chou | H04W 4/008 455/41.1 |
| 2014/0337956 A1* | 11/2014 | Korgaonkar | H04W 12/06 726/9 |
| 2015/0035386 A1* | 2/2015 | Pietri | H04M 1/7253 307/130 |
| 2015/0044964 A1* | 2/2015 | Khan | G06F 21/35 455/41.1 |
| 2015/0065042 A1* | 3/2015 | Akita | H04W 4/023 455/41.1 |
| 2015/0169039 A1* | 6/2015 | Teshima | H04W 4/008 713/324 |
| 2016/0171259 A1* | 6/2016 | Kaechi | G06K 7/10158 340/10.34 |

* cited by examiner

F I G. 6

| STATE OF BATTERY VOLTAGE Vbatt | POWER SUPPLY STATE OF CPU (APPARATUS MAIN BODY) | CONTROL DEVICE OF NON-CONTACT IC | WIRELESS COMMUNICATION OPERATION OF NON-CONTACT IC |
|---|---|---|---|
| $0 \leq Vbatt < Vb1$ | OFF | — | ENABLE |
| $Vb1 \leq Vbatt$ | OFF | — | ENABLE |
| | ON | CPU | DISABLE |
| | | | ENABLE |

F I G. 7
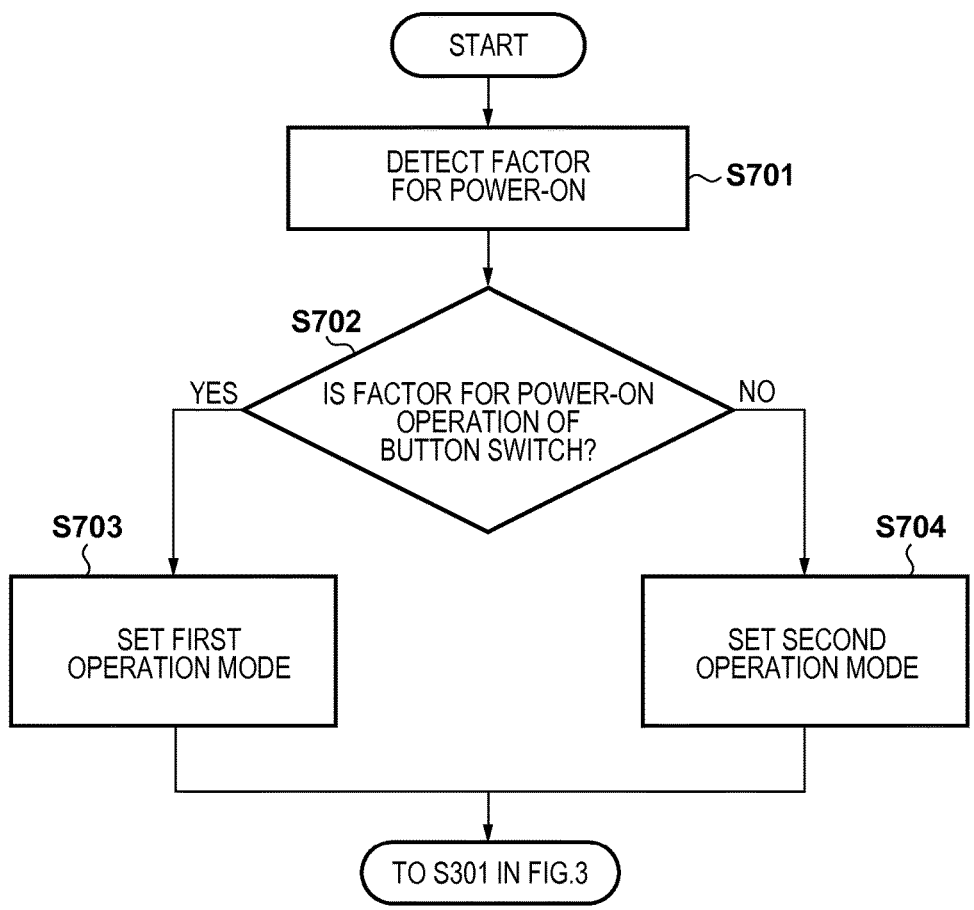

F I G. 10

| STATE OF BATTERY VOLTAGE Vbatt | POWER SUPPLY STATE OF CPU (APPARATUS MAIN BODY) | CONTROL DEVICE OF NON-CONTACT IC | WIRELESS COMMUNICATION OPERATION OF NON-CONTACT IC |
|---|---|---|---|
| $0 \leq Vbatt < Vb1$ | OFF | VOLTAGE DETECTION CIRCUIT | DISABLE |
| $Vb1 \leq Vbatt < Vt1$ | OFF | VOLTAGE DETECTION CIRCUIT | DISABLE |
| | ON | CPU | DISABLE |
| | | | ENABLE |
| $Vt1 \leq Vbatt$ | OFF | VOLTAGE DETECTION CIRCUIT | ENABLE |
| | ON | CPU | DISABLE |
| | | | ENABLE |

COMMUNICATION APPARATUS CONTROLLING CLOSE PROXIMITY WIRELESS COMMUNICATION UNIT, CONTROL METHOD THEREOF AND STORAGE MEDIUM

BACKGROUND OF THE INVENTION

Field of the Invention

The present invention relates to a communication control technique in a communication apparatus capable of performing wireless communication via an antenna.

Description of the Related Art

In recent years, a so-called handover technique of facilitating setting for wireless communication by incorporating a non-contact IC in a portable apparatus capable of performing wireless communication has been implemented. For example, Japanese Patent Laid-Open No. 2013-157736 discloses a system in which apparatuses share communication parameters (an SSID and password) necessary for wireless LAN connection by using NFC (Near Field Communication) to readily establish a wireless LAN connection. In this case, one of the apparatuses incorporates a non-contact IC tag and the other incorporates a reader/writer for communicating with the non-contact IC tag.

A non-contact IC can store data in an internal memory, and a reader/writer apparatus can perform an operation of reading out data from the internal memory of the non-contact IC and an operation of writing data in the internal memory.

Note that the non-contact IC can perform a wireless communication operation by using, as power, electromagnetic waves received from the reader/writer apparatus. Consequently, even if the wireless communication apparatus incorporating the non-contact IC is OFF, the reader/writer apparatus can perform an operation of writing or reading out data in or from the non-contact IC.

As described above, the non-contact IC can perform an operation without receiving power supply from the apparatus incorporating it. This is an advantage of the non-contact IC but may impose an inconvenience. For example, even if the user does not desire wireless communication by the non-contact IC, wireless communication may be performed against user's intention. For example, a non-contact IC chip is kept enabled during a period from when power supply to the non-contact IC chip is stopped by a power-off operation or the like accepted by the apparatus from the user until the power supply voltage of the non-contact IC chip decreases to an inoperable voltage. That is, when the reader/writer apparatus comes closer, a wireless communication operation may be unwantedly performed. This may cause the inconvenience that the reader/writer apparatus attempts to perform handover while the apparatus incorporating the non-contact IC is powered off. In addition, when the reader/writer apparatus comes closer, the apparatus incorporating the non-contact IC may be powered on with hardware, resulting in inconsistency with shutdown processing of software. In this case, the hardware is operating, thereby wasting a battery.

SUMMARY OF THE INVENTION

The present invention has been made in consideration of the aforementioned problems, and reduces the possibility that a non-contact communication function is enabled at a timing unintended by the user.

In order to solve the aforementioned problems, the present invention provides a communication apparatus comprising: a close proximity wireless communication unit configured to be able to perform close proximity wireless communication with an external apparatus; a power control unit configured to start control of power supply of the communication apparatus when the close proximity wireless communication unit receives electromagnetic waves from the external apparatus; and a control unit configured to execute shutdown processing for reducing power to each block controlled by the power control unit, wherein when the shutdown processing is executed, the control unit disables the close proximity wireless communication unit before start of the shutdown processing.

In order to solve the aforementioned problems, the present invention provides a communication apparatus comprising: a close proximity wireless communication unit configured to be able to perform close proximity wireless communication with an external apparatus; a power control unit configured to start control of power supply to each block of the communication apparatus; and a control unit configured to execute shutdown processing for reducing power to each block controlled by the power control unit, wherein when the close proximity wireless communication unit receives electromagnetic waves from the external apparatus, the close proximity wireless communication unit transmits a signal to the power control unit, and the power control unit starts control of power supply to each block of the communication apparatus in accordance with the signal from the close proximity wireless communication unit, and wherein when the shutdown processing is executed, the control unit controls not to transmit the signal from the close proximity wireless communication unit to the power control unit before start of the shutdown processing.

In order to solve the aforementioned problems, the present invention provides a communication apparatus comprising: a close proximity wireless communication unit configured to be able to perform close proximity wireless communication with an external apparatus; a power control unit configured to start power supply processing of the communication apparatus when the close proximity wireless communication unit receives electromagnetic waves from the external apparatus; and a control unit configured to execute shutdown processing for reducing power to each block controlled by the power control unit, wherein the shutdown processing and the power supply processing are not executed at the same time.

In order to solve the aforementioned problems, the present invention provides a control method of a communication apparatus having a close proximity wireless communication unit configured to be able to perform close proximity wireless communication with an external apparatus, the method comprising: a power control step of starting control of power supply of the communication apparatus when the close proximity wireless communication unit receives electromagnetic waves from the external apparatus; and a control step of executing shutdown processing for reducing power to each unit controlled in the power control step, wherein when the shutdown processing is executed, the close proximity wireless communication unit is disabled in the control step before the shutdown processing starts.

In order to solve the aforementioned problems, the present invention provides a control method of a communication apparatus having a close proximity wireless communication unit configured to be able to perform close proximity wireless communication with an external apparatus, the method comprising: a power control step of starting control of power supply to each block of the communication apparatus; and a control step of executing shutdown processing for reducing power to each block controlled in the power control step, wherein when the close proximity wireless communication unit receives electromagnetic waves from the external apparatus, the close proximity wireless communication unit transmits a signal for the power control step, and control of power supply to each unit of the communication apparatus starts in accordance with the signal from the close proximity wireless communication unit in the power control step, and wherein when the shutdown processing is executed, it is controlled, in the control step, not to transmit the signal from the close proximity wireless communication unit in the power control step before start of the shutdown processing.

In order to solve the aforementioned problems, the present invention provides a control method of a communication apparatus having a close proximity wireless communication unit configured to be able to perform close proximity wireless communication with an external apparatus, the method comprising: a power control step of starting power supply processing of the communication apparatus when the close proximity wireless communication unit receives electromagnetic waves from the external apparatus; and a control step of executing shutdown processing for reducing power to each block controlled in the power control step, wherein the shutdown processing and the power supply processing are not executed at the same time.

According to the present invention, it is possible to reduce the possibility that a non-contact communication function is enabled at a timing unintended by the user.

Further features of the present invention will become apparent from the following description of exemplary embodiments (with reference to the attached drawings).

BRIEF DESCRIPTION OF THE DRAWINGS

FIG. 6 is a table showing the truth table for the operation state of the wireless communication apparatus and a wireless communication operation according to the second embodiment;

FIG. 7 is a flowchart illustrating a control procedure by the software of the wireless communication apparatus according to the second embodiment;

FIG. 10 is a table showing the truth table for the operation state of the wireless communication apparatus and a wireless communication operation according to the third embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

A system in which a digital camera serving as a communication apparatus according to the present invention and a smartphone serving as an external wireless communication apparatus (reader/writer apparatus) can wirelessly communicate with each other will be described below.

In the embodiments, for example, the digital camera and the smartphone perform wireless communication according to the first non-contact communication standard (close proximity wireless communication such as NFC (Near Field Communication)), and uses it as a trigger to exchange pieces of paring information, thereby performing a cooperation operation (handover function) of starting wireless communication by switching the standard to the second communication standard (Wi-Fi or the like).

Note that the embodiments assume the digital camera as a communication apparatus but are also applicable to a camera-equipped mobile phone, smartphone, tablet terminal, game machine, and the like.

Furthermore, the embodiments assume, as an external wireless communication apparatus, the smartphone that is a kind of mobile phone but are also applicable to a portable electric device such as another camera-equipped mobile phone tablet terminal. An information processing apparatus such as a camera-equipped personal computer may also be used.

First Embodiment

In the first embodiment, a wireless communication apparatus incorporating a non-contact IC which can perform a wireless communication operation only when operation power is supplied to the non-contact IC of the wireless communication apparatus will be described.

In this embodiment, wireless communication of the non-contact IC conforms to an international standard ISO/IEC21481.

<Apparatus Configuration>

An overview of the configuration and functions of a wireless communication apparatus according to the embodiment of the present invention will be described with reference to FIG. 1.

Figure 1:
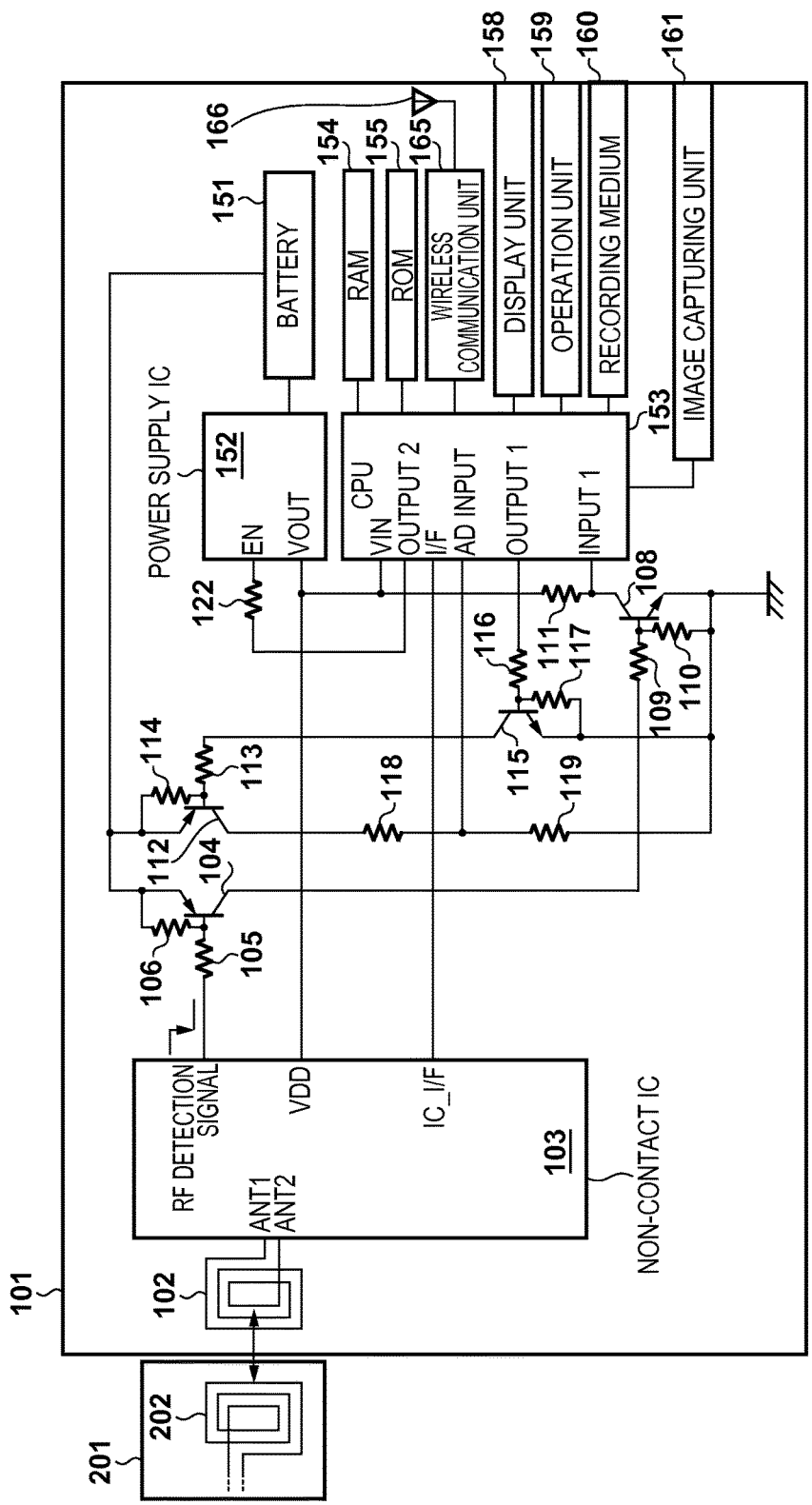
FIG. 1 is a block diagram showing the configuration of a wireless communication apparatus according to the first embodiment.

Note that power supply connections to blocks unnecessary for a description of this embodiment are not shown in FIG. 1.

Referring to FIG. 1, an antenna 102 receives electromagnetic waves from an external wireless communication apparatus 201. When power is supplied to the VDD terminal of a non-contact IC 103 in a wireless communication apparatus 101, the non-contact IC 103 can cause the antenna 102 to receive electromagnetic waves transmitted from the external wireless communication apparatus 201, thereby performing a wireless communication operation. That is, the non-contact IC 103 has no power supply function of generating power from the electromagnetic waves received by the antenna 102 and supplying the generated power to perform a wireless communication operation, and requires a power supply voltage VDD to operate an internal circuit for performing a wireless communication operation.

The external wireless communication apparatus 201 has a reader/writer function for the non-contact IC 103 of the wireless communication apparatus 101. An antenna 202 communicates with the antenna 102 of the wireless communication apparatus 101, and a reader/writer unit (not shown) of the external wireless communication apparatus 201 performs an operation of reading out/writing data from/in the non-contact IC 103 of the wireless communication apparatus 101.

Note that in this embodiment, the internal configuration of the external wireless communication apparatus 201 will be neither shown nor described.

In the following description, assume that the non-contact IC 103 incorporated in the wireless communication apparatus 101 performs a wireless communication operation with the non-contact IC reader/writer of the external wireless communication apparatus 201. A description of the function and operation of the non-contact IC reader/writer will be omitted, and it is assumed that the non-contact IC 103 receives electromagnetic waves from the external wireless communication apparatus 201 to perform a wireless communication operation.

The non-contact IC 103 according to this embodiment has a function of outputting an RF detection signal from an RF terminal upon receiving electromagnetic waves and communication information (pairing information or the like) from the external wireless communication apparatus 201 via the antenna 102. The RF terminal is the transistor negative logical signal output of an open drain or open collector which is rendered conductive upon power-on and is set in a high-impedance state upon power-off.

To perform a wireless communication operation via an IC_I/F terminal as the wired interface of the non-contact IC 103, the wireless communication apparatus 101 requires the power supply voltage VDD. While the power supply voltage VDD is supplied, the non-contact IC 103 is controlled, via the IC_I/F terminal, by a CPU 153 serving as a control unit, thereby allowing the wireless communication operation of the non-contact IC 103 and the operation of writing/reading out data by the internal circuit.

The CPU 153 can switch between enabling and disabling of the wireless communication operation of the non-contact IC 103 via its IC_I/F terminal. An operation of enabling the wireless communication operation of the non-contact IC 103 will be referred to as "ENABLE" hereinafter and an operation of disabling the wireless communication operation of the non-contact IC 103 will be referred to as "DISABLE" hereinafter. The non-contact IC 103 switches whether to establish communication, by referring to data indicating whether DISABLE or ENABLE has been set, and returning a response to wireless communication from the external apparatus. That is, if ENABLE has been set, the non-contact IC 103 returns a response to wireless communication from the external apparatus. Alternatively, if DISABLE has been set, the non-contact IC 103 returns no response to wireless communication from the external apparatus.

A transistor 104 inverts the logic of the RF detection signal. A resistor 105 is the base resistor of the transistor 104, and a resistor 106 is the base-emitter resistor of the transistor 104. A transistor will be referred to as a TR hereinafter.

A TR 108 further inverts the logic of the RF detection signal of the non-contact IC 103, and transfers it to the CPU 153. A resistor 109 is the base resistor of the TR 108, and a resistor 110 is the base-emitter resistor of the TR 108. A resistor 111 is the pull-up resistor of input 1 of the CPU 153 (to be described later).

When the RF detection signal of the non-contact IC 103 is turned on, the TRs 104 and 108 are turned on, and the RF detection signal is transferred to input 1.

A TR 112 performs a switching operation for applying the voltage of a battery 151 serving as a power supply unit to the AD input of the CPU 153. A resistor 113 is the base resistor of the TR 112, and a resistor 114 is the base-emitter resistor of the TR 112. Resistors 118 and 119 are voltage dividing resistors for dividing and inputting the voltage of the battery 151 to the AD input when the TR 112 is ON. A TR 115 inverts the logic of output 1 of the CPU 153. A resistor 116 is the base resistor of the TR 115 and a resistor 117 is the base-emitter resistor of the TR 115.

When output 1 of the CPU 153 is set to high level, the TRs 115 and 112 are turned on, and the divided voltages of the battery 151 are applied to the AD input.

The battery 151 supplies power to the wireless communication apparatus 101 under the control of a power supply IC 152. The power supply IC 152 outputs a voltage from a VOUT terminal by an EN signal from the CPU 153. The EN terminal of the power supply IC 152 is connected to output 2 of the CPU 153 via a resistor 122, and can be controlled by the CPU 153.

When output 2 of the CPU 153 is set to high level, the power supply IC 152 is turned on and outputs a voltage from the VOUT terminal.

The CPU 153 is a central processing unit for controlling the overall operation of the wireless communication apparatus 101. A RAM 154 is a volatile memory used as a work area of the CPU 153. A ROM 155 is a memory storing software in which the control procedure of the CPU 153 is described and, for example, a rewritable nonvolatile memory such as a flash memory is used.

A display unit 158 is implemented using, for example, an LCD panel, and displays image data, operation information, and the like. An operation unit 159 accepts various operations of the wireless communication apparatus 101, and transfers operation information to the CPU 153. The operation unit 159 is formed by, for example, a plurality of button switches including a power button switch.

A recording medium 160 is, for example, a memory card in which digital data can be written or loaded.

An image capturing unit 161 includes an image sensor and an optical system formed by a lens, a driving circuit, and the like.

A wireless communication unit 165 wirelessly communicates with an external apparatus via an antenna 166. The wireless communication unit 165 supports a wireless communication standard such as the IEEE802.11 WLAN standard, which is different from that supported by the non-contact IC 103.

The operations of the peripheral circuits of the non-contact IC 103 according to this embodiment will now be explained.

In the following description, assume that the OFF state of the wireless communication apparatus 101 (the apparatus main body thereof) indicates a state in which no voltage is output from the VOUT terminal of the power supply IC 152, and the CPU 153 is OFF and performs no control processing. The ON state of the wireless communication apparatus 101 indicates a state in which a voltage is output from the VOUT terminal of the power supply IC 152, and the CPU 153 is ON and performs control processing.

An operation when the non-contact IC 103 receives electromagnetic waves and communication information from the external wireless communication apparatus 201 in the OFF state of the wireless communication apparatus 101 will be described first.

In the OFF state of the wireless communication apparatus 101, even if the non-contact IC 103 receives electromagnetic waves and communication information from the external wireless communication apparatus 201, non-contact IC 103 is not supplied with the power supply voltage VDD and thus cannot respond to the external wireless communication apparatus 201, and therefore nothing occurs.

An operation when the non-contact IC 103 receives electromagnetic waves and communication information from the external wireless communication apparatus 201 in the ON state of the wireless communication apparatus 101 will be described next.

In the ON state of the wireless communication apparatus 101, the power supply voltage VDD is supplied to the non-contact IC 103. Therefore, upon receiving electromagnetic waves and communication from the external wireless communication apparatus 201, the non-contact IC 103 outputs an RF detection signal. The logic of the RF detection signal output from the non-contact IC 103 is inverted by the TR 104, further inverted by the TR 108, and then transferred to input 1 of the CPU 153. By detecting the input signal to input 1, the CPU 153 can determine that wireless communication has been performed between the external wireless communication apparatus 201 and the non-contact IC 103.

Figure 2:
FIG. 2 is a table showing the truth table for the operation state of the wireless communication apparatus and a wireless communication operation according to the first embodiment.

FIG. 2 shows the truth table for the states of the peripheral circuits of the non-contact IC 103 of the wireless communication apparatus 101 and the wireless communication operation of the non-contact IC 103 according to the first embodiment.

Let Vb1 be the lowest operation voltage of the power supply IC 152. When a battery voltage Vbatt of the battery 151 satisfies 0≤Vbatt<Vb1, the power supply IC 152 cannot operate and thus the CPU 153 is OFF. If the CPU 153 is OFF, the wireless communication operation of the non-contact IC 103 is only set to "DISABLE".

When the battery voltage Vbatt of the battery 151 satisfies Vb1≤Vbatt, the power supply IC 152 can operate and thus the CPU 153 can be set in either the ON or OFF state. If the CPU 153 is OFF, the wireless communication operation of the non-contact IC 103 is set to "DISABLE". On the other hand, if the CPU 153 is ON, the wireless communication operation of the non-contact IC 103 can be set to either "DISABLE" or "ENABLE" under the control of the CPU 153.

<Description of Operation>

Operations by the software and hardware of the wireless communication apparatus 101 according to the first embodiment will be described with reference to FIGS. 3 and 4.

A control procedure by the software will be explained first with reference to FIG. 3.

Figure 3:
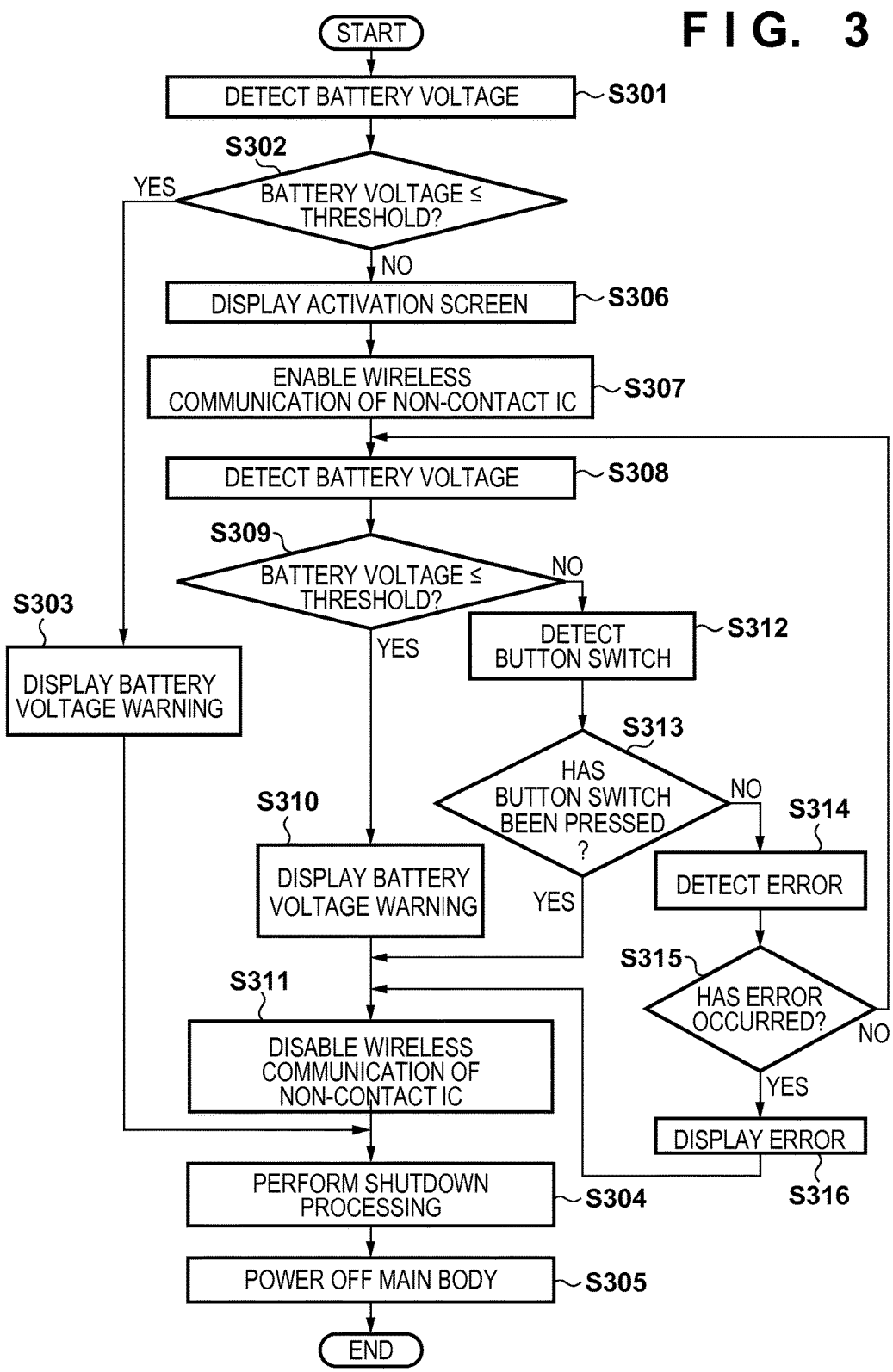
FIG. 3 is a flowchart illustrating a control procedure by the software of the wireless communication apparatus according to the first embodiment.

Note that activation of the software for executing the control procedure shown in FIG. 3 starts when the power button switch included in the operation unit 159 of the wireless communication apparatus 101 is turned on and a voltage is applied from the VOUT terminal of the power supply IC 152 to the CPU 153 and the non-contact IC 103. Assume that at this time, the activation of the software of the wireless communication apparatus 101 is only partially complete, and some functions controlled by the software, for example, the image capturing unit 161, display unit 158, and wireless communication unit 165 are not operating.

In step S301, the CPU 153 detects the battery voltage of the battery 151 by controlling output 1 to high level to turn on the TRs 115 and 112.

In step S302, the CPU 153 determines whether the battery voltage of the battery 151 is equal to or lower than a threshold. The threshold of the battery voltage is set to, for example, a voltage value at which the normal operations of some functions under the control of the software of the wireless communication apparatus 101 are ensured.

If the CPU 153 determines in step S302 that the battery voltage is equal to or lower than the threshold, the process advances to step S303.

In step S303, the CPU 153 displays a battery voltage warning on the display unit 158.

In step S304, the CPU 153 performs shutdown processing of terminating the software.

In step S305, the CPU 153 performs processing of turning off the power supply IC 152, thereby terminating the process.

If the CPU 153 determines in step S302 that the battery voltage exceeds the threshold, the process advances to step S306.

In step S306, after the CPU 153 completes the activation of the software and some functions which are not operating are made operable, the CPU 153 displays an activation screen on the display unit 158. This step completes the power supply processing started in step S301. Note that even if a power-off operation such as pressing of a power button is performed during the power supply processing from step S301 to step S306, this operation is ignored. In other words, once the power supply processing starts, a power-off operation is disabled until the processing is completed in step S306.

In step S307, the CPU 153 sets the wireless communication operation of the non-contact IC 103 to "ENABLE" via the IC_I/F terminal as a wired interface, and stores it in the register (storage unit) of the internal circuit of the non-contact IC 103.

In this embodiment, assume that before the CPU 153 makes a register setting for setting the wireless communication operation of the non-contact IC 103 to "ENABLE" in step S307, the initial value of the wireless communication operation of the non-contact IC 103 is "DISABLE".

After the CPU 153 makes a register setting for setting the wireless communication operation of the non-contact IC 103 to "ENABLE" in step S307, the non-contact IC 103 is set in a state in which it responds to reception of electromagnetic waves and communication information from the external wireless communication apparatus 201.

Note that when the non-contact IC 103 receives electromagnetic waves and communication information from the external wireless communication apparatus 201, the RF detection signal of the non-contact IC 103 is input to input 1 of the CPU 153. The CPU 153 can control the wireless communication unit 165 by using the input of the RF detection signal as a trigger, and start a cooperation operation of communicating with the external wireless communication apparatus 201 according to a different communication standard such as the Wi-Fi standard by the handover function. Note that in this embodiment, the wireless communication apparatus 101 serves as an access point. That is, by using, as a trigger, reception of electromagnetic waves and communication information by the non-contact IC 103 from the external wireless communication apparatus 201, the wireless communication apparatus 101 creates a network. By using, as a trigger, reception of a response from the non-contact IC 103, the external wireless communication apparatus 201 joins the network created by the wireless communication apparatus 101.

After the CPU 153 makes a register setting for enabling the wireless communication operation of the non-contact IC 103 in step S307, it repeats error monitoring of the battery voltage of the battery 151, the power button switch included in the operation unit 159, and other software processes.

In step S308, the CPU 153 controls output 1 to high level to turn on the TRs 115 and 112, thereby detecting the battery voltage of the battery 151.

In step S309, the CPU 153 determines whether the battery voltage of the battery 151 is equal to or lower than a threshold. Assume that this threshold of the battery voltage has been set to the same value as in step S302.

If the CPU 153 determines in step S309 that the battery voltage is equal to or lower than the threshold, the process advances to step S310.

In step S310, the CPU 153 displays a battery voltage warning on the display unit 158, and the process advances to step S311.

In step S311, before performing shutdown processing, the CPU 153 makes a register setting for setting the wireless communication operation of the non-contact IC 103 to "DISABLE" via the IC_I/F terminal of the non-contact IC 103.

After that, the CPU 153 performs the shutdown processing in step S304 and the power-off processing in step S305, thereby terminating the process.

After the CPU 153 makes a register setting for setting the wireless communication operation of the non-contact IC 103 to "DISABLE" in step S311, the non-contact IC 103 is set in a state in which it does not respond to reception of electromagnetic waves and communication information from the external wireless communication apparatus 201. In this state, even if the non-contact IC 103 receives electromagnetic waves and communication information from the external wireless communication apparatus 201, it outputs no RF detection signal to the CPU 153.

As described above, prior to an operation of stopping the operations of the respective units of the wireless communication apparatus 101 including the non-contact IC 103 by actually turning off the power by the shutdown processing, the operation of the non-contact IC 103 is disabled. This can prevent the external wireless communication apparatus 201, which has come closer during the shutdown processing, from unnecessarily performing handover.

The register setting of the non-contact IC 103 is held while the power supply voltage VDD of the non-contact IC 103 is supplied, and is cleared when the supply of the power supply voltage VDD is stopped.

On the other hand, if the CPU 153 determines in step S309 that the battery voltage is equal to or higher than the threshold, the process advances to step S312.

In step S312, the CPU 153 detects the presence/absence of an operation input from the power button switch included in the operation unit 159.

In step S313, the CPU 153 determines whether the power button switch included in the operation unit 159 has been pressed.

If the CPU 153 determines in step S313 that the power button switch has been pressed, the process advances to step S311.

On the other hand, if the CPU 153 determines in step S313 that the power button switch has not been pressed, the process advances to step S314.

In step S314, the CPU 153 detects an error in the hardware and software of the wireless communication apparatus 101.

In step S315, the CPU 153 determines whether an error has occurred in the hardware and software of the wireless communication apparatus 101.

If the CPU 153 determines in step S315 that an error has occurred in the hardware and software of the wireless communication apparatus 101, the process advances to step S316.

In step S316, the CPU 153 displays the error on the display unit 158, and the process advances to step S311.

On the other hand, if the CPU 153 determines in step S315 that no error has occurred in the hardware and software of the wireless communication apparatus 101, the process returns to step S308.

An operation procedure by the hardware will be described next with reference to FIG. 4.

In step S401, the non-contact IC 103 determines whether the power supply voltage VDD of the non-contact IC 103 is applied.

If the non-contact IC 103 determines in step S401 that the power supply IC 152 supplies the power supply voltage VDD, the process advances to step S402.

In step S402, the non-contact IC 103 determines whether the register setting of the wireless communication operation is "ENABLE".

If the non-contact IC 103 determines in step S402 that the register setting of the wireless communication operation is "ENABLE", the process is terminated while maintaining the state in which the non-contact IC 103 responds to reception of electromagnetic waves and communication information from the external wireless communication apparatus 201.

On the other hand, if the non-contact IC 103 determines in step S402 that the register setting of the wireless communication operation is "DISABLE", the process returns to step S403 while maintaining the state in which the non-contact IC 103 does not respond to reception of electromagnetic waves and communication information from the external wireless communication apparatus 201.

If the non-contact IC 103 determines in step S401 that no power supply voltage VDD is supplied, the process advances to step S403.

In step S403, the non-contact IC 103 clears the register setting of the wireless communication operation.

In step S404, the non-contact IC 103 sets the register setting of the wireless communication operation to the initial value "DISABLE", thereby terminating the process.

The operation of the wireless communication apparatus 101 according to this embodiment has been explained.

As described above, the CPU 153 according to this embodiment sets the wireless communication operation of the non-contact IC 103 to "DISABLE" before executing the shutdown processing of the software of the wireless communication apparatus 101. That is, the non-contact IC 103 is prevented from responding to an external signal before the shutdown processing. This prevents unintended communication from being performed when the apparatus comes closer during the shutdown processing. As a result, it is possible to prevent the external wireless communication apparatus 201 from unnecessarily performing handover using, as a trigger, communication at an unintended timing.

Second Embodiment

In the first embodiment, it is possible to perform a wireless communication operation while the power supply voltage VDD is applied to the non-contact IC 103, and the initial value of the wireless communication operation of the non-contact IC 103 is set to "DISABLE". To the contrary, a non-contact IC 503 according to the second embodiment can perform a wireless communication operation by using, as power, a power supply voltage VDD or electromagnetic waves from an external apparatus, and the initial value of the wireless communication operation of the non-contact IC 503 is set to "ENABLE".

In this embodiment as well, assume that wireless communication of the non-contact IC conforms to the international standard ISO/IEC21481, similarly to the first embodiment.

<Apparatus Configuration>

An overview of the configuration and functions of a wireless communication apparatus according to the second embodiment will be described with reference to FIGS. 5 and 6.

Figure 5:
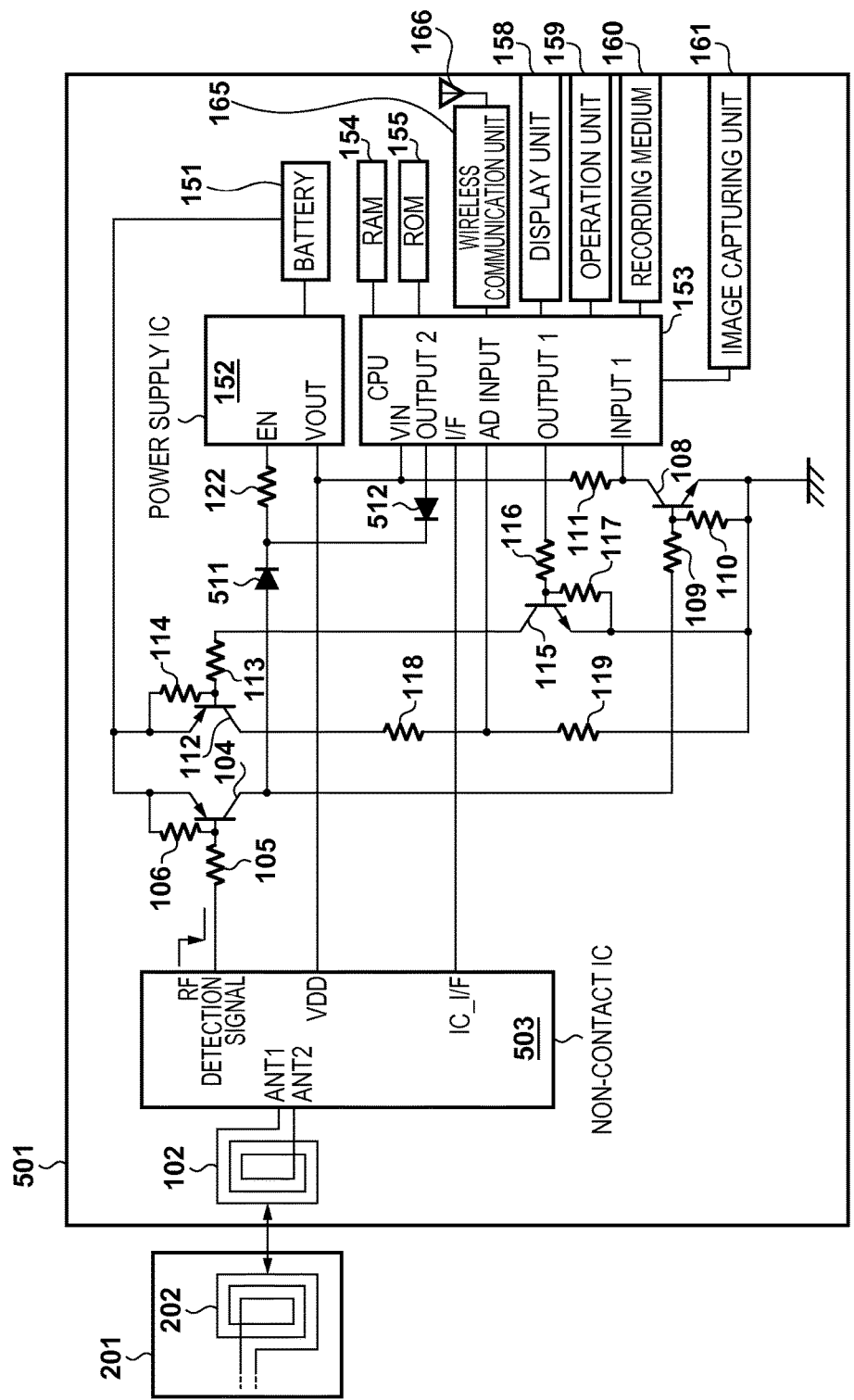
FIG. 5 is a block diagram showing the configuration of a wireless communication apparatus according to the second embodiment.

Note that the same reference numerals as those in FIG. 1 denote the same components in FIG. 5 and the differences from the first embodiment will be mainly described. In a block diagram used for a description of this embodiment, power supply connections to blocks unnecessary for the description of this embodiment are not shown.

Referring to FIG. 5, diodes 511 and 512 are connected to the EN terminal of a power supply IC 152 via a resistor 122, and control signals for the power supply IC 152, which are output from the non-contact IC 503 and a CPU 153, are ORed and input.

The function of the non-contact IC 503 according to this embodiment is different from that of the non-contact IC 103 according to the first embodiment.

That is, the non-contact IC 103 shown in FIG. 1 has no power supply function of generating power for wireless communication from electromagnetic waves received by the antenna 102, and the power supply voltage VDD is required to operate the internal circuit for performing wireless communication.

To the contrary, the non-contact IC 503 shown in FIG. 5 has a power supply function of generating power for wireless communication from electromagnetic waves received by an antenna 102, and can perform wireless communication by using only electromagnetic waves from an external wireless communication apparatus 201 regardless of whether the power supply voltage VDD is supplied. In this embodiment, the initial value of the wireless communication operation of the non-contact IC 503 is "ENABLE".

The operations of the peripheral circuits of the non-contact IC 503 according to this embodiment will now be explained.

An operation when the non-contact IC 503 receives electromagnetic waves and communication from the external wireless communication apparatus 201 while a wireless communication apparatus 501 is OFF will be described.

Upon receiving electromagnetic waves and communication information from the external wireless communication apparatus 201 while the wireless communication apparatus 501 is OFF, the non-contact IC 503 outputs an RF detection signal. The logic of the RF detection signal of the non-contact IC 503 is inverted by a TR 104. On one hand, the inverted signal is input to the EN terminal of the power supply IC 152 to drive it. The CPU 153 starts an operation with an output voltage from the VOUT terminal of the power supply IC 152. After the CPU 153 starts the operation, the CPU 153 sets output 2 to high level under the control of software, thereby continuing driving of the power supply IC 152. On the other hand, after the logic of the RF detection signal of the non-contact IC 503 is inverted by the TR 104, it is further inverted by a TR 108, and input to input 1 of the CPU 153. By detecting the signal of input 1, the CPU 153 can determine that wireless communication has been performed between the external wireless communication apparatus 201 and the non-contact IC 503.

An operation when the non-contact IC 503 receives electromagnetic waves and communication information from the external wireless communication apparatus 201 while the wireless communication apparatus 501 is ON will be described next.

Upon receiving electromagnetic waves and communication information from the external wireless communication apparatus 201 while the wireless communication apparatus 501 is ON, an RF detection signal is outputs, similarly to a case in which the wireless communication apparatus 501 is OFF. The logic of the RF detection signal of the non-contact IC 503 is inverted by the TR 104, further inverted by the TR 108, and then input to input 1 of the CPU 153. By detecting the signal of input 1, the CPU 153 can determine that wireless communication has been performed between the external wireless communication apparatus 201 and the non-contact IC 503.

FIG. 6 shows the truth table for the states of the peripheral circuits of the non-contact IC 503 of the wireless communication apparatus 501 and the wireless communication operation of the non-contact IC 503 according to the second embodiment.

Let Vb1 be the lowest operation voltage of the power supply IC 152. When a battery voltage Vbatt of a battery 151 satisfies $0 \leq Vbatt < Vb1$, the power supply IC 152 cannot operate and thus the CPU 153 is OFF. Since the non-contact IC 503 can perform wireless communication by using only electromagnetic waves from the external wireless communication apparatus 201 regardless of whether the power supply voltage VDD is supplied, even if the CPU 153 is OFF, the wireless communication operation of the non-contact IC 503 is set to "ENABLE".

When the battery voltage Vbatt of the battery 151 satisfies $Vb1 \leq Vbatt$, the power supply IC 152 can operate and thus the CPU 153 can be set in either the ON or OFF state. If the CPU 153 is OFF, the wireless communication operation of the non-contact IC 503 is set to "ENABLE". On the other hand, if the CPU 153 is ON, the wireless communication operation of the non-contact IC 503 can be set to either "DISABLE" or "ENABLE" under the control of the CPU 153.

<Description of Operation>

Operations by the software and hardware of the non-contact IC 503 of the wireless communication apparatus 501 according to the second embodiment will be described with reference to FIGS. 7 and 8.

A control procedure by the software will be explained first with reference to FIG. 7.

Note that activation of the software for executing the control procedure shown in FIG. 7 starts upon application of a voltage from the power supply IC 152 to the CPU 153 and non-contact IC 503 when a power button switch included in an operation unit 159 of the wireless communication apparatus 501 is turned on or electromagnetic waves and communication information are received from the external wireless communication apparatus 201. Assume that at this time, the activation of the software of the wireless communication apparatus 501 is only partially complete, and some functions controlled by the software, for example, an image capturing unit 161, display unit 158, and wireless communication unit 165 are not operating.

In step S701, the CPU 153 detects a factor for power-on. More specifically, the CPU 153 detects the logic of input 1 and the power button switch included in the operation unit 159.

In step S702, the CPU 153 determines whether the factor for power-on detected in step S501 is the power button switch included in the operation unit 159 or the RF detection signal of the non-contact IC 503. If no RF detection signal of the non-contact IC 503 has been input to input 1 of the CPU 153, the logic of input 1 of the CPU 153 is at high level, and thus the CPU 153 can determine that the factor for power-on is the power button switch included in the operation unit 159. If the RF detection signal of the non-contact IC 503 has been input to input 1 of the CPU 153, the logic of input 1 of the CPU 153 is at low level and thus the CPU 153 can determine that the factor for power-on is the RF detection signal of the non-contact IC 503.

If the CPU 153 determines in step S702 that the factor for power-on is the power button switch included in the operation unit 159, the process advances to step S703.

In step S703, the CPU 153 sets the wireless communication apparatus 501 in the first operation mode.

On the other hand, if the CPU 153 determines in step S702 that the factor for power-on is the RF detection signal of the non-contact IC 503, the process advances to step S704.

In step S704, the CPU 153 sets the wireless communication apparatus 501 in the second operation mode.

The CPU 153 may change the subsequent operation of the wireless communication apparatus 501 depending on whether the operation mode is the first operation mode or the second operation mode. For example, the threshold of the battery voltage of the battery 151 in step S302 or S309 may be changed depending on the operation mode. Some of functions to be enabled among the functions of the wireless communication apparatus 101 may be changed, and contents to be displayed on the display unit 158 and a display method may also be changed.

The processes in step S301 and subsequent steps are the same as those in FIG. 3 and a description thereof will be omitted. However, in the second embodiment, since the initial value of the wireless communication operation of the non-contact IC 503 is "ENABLE" before making a register setting for setting the wireless communication operation of the non-contact IC 503 to "ENABLE" in step S307, the state of the wireless communication operation of the non-contact IC 503 remains unchanged before and after making a setting.

Although the initial value of the wireless communication operation of the non-contact IC 503 according to this embodiment is "ENABLE", the wireless communication operation is temporarily set to "DISABLE" in step S311 before the start of shutdown processing, similarly to the first embodiment. In this state, even if the non-contact IC 503 receives electromagnetic waves and communication information from the external wireless communication apparatus 201, it outputs no RF detection signal to the power supply IC 152.

Note that in this embodiment, the reason why such operation is performed is as follows in addition to the reason described in step S311 of the first embodiment. That is, in the shutdown processing, the hardware is reset by decreasing the voltage to each unit to a predetermined value or less. If power supply by the power supply IC 152 starts during this processing, the voltage does not decrease to the threshold at which the hardware is reset, and thus the battery is wasted and the apparatus freezes due to incompletion of the hardware reset operation. In this case, this state cannot be canceled unless reactivation is performed by pressing the power button. To prevent the occurrence of such situation, before actually turning off the power, the non-contact IC is set in advance not to respond when entering a power-off preparation state (that is, starting the shutdown processing).

The register setting of the non-contact IC 503 is held while the power supply voltage VDD is supplied to the non-contact IC 503 or electromagnetic waves are supplied to the antenna 102, and is cleared when the supply of the power supply voltage VDD or the supply of the electromagnetic waves to the antenna 102 is stopped.

An operation procedure by the hardware will be described next with reference to FIG. 8.

In step S801, the non-contact IC 503 determines whether electromagnetic waves are supplied from the external wireless communication apparatus 201.

If the non-contact IC 503 determines in step S801 that electromagnetic waves are supplied from the external wireless communication apparatus 201, the process advances to step S402.

In step S402, the non-contact IC 503 determines whether the register setting of the wireless communication operation is "ENABLE".

If the non-contact IC 503 determines in step S402 that the register setting of the wireless communication operation is "ENABLE", the process advances to step S802.

In step S802, the wireless communication operation of the non-contact IC 503 is set to "ENABLE" according to the register setting value.

On the other hand, if the non-contact IC 503 determines in step S402 that the register setting of the wireless communication operation is "DISABLE", the process returns to step S801 while maintaining the state in which the non-contact IC 503 does not respond to reception of electromagnetic waves and communication information from the external wireless communication apparatus 201.

If the non-contact IC 503 determines in step S801 that no electromagnetic waves are supplied from the external wireless communication apparatus 201, the process advances to step S401.

Figure 4:
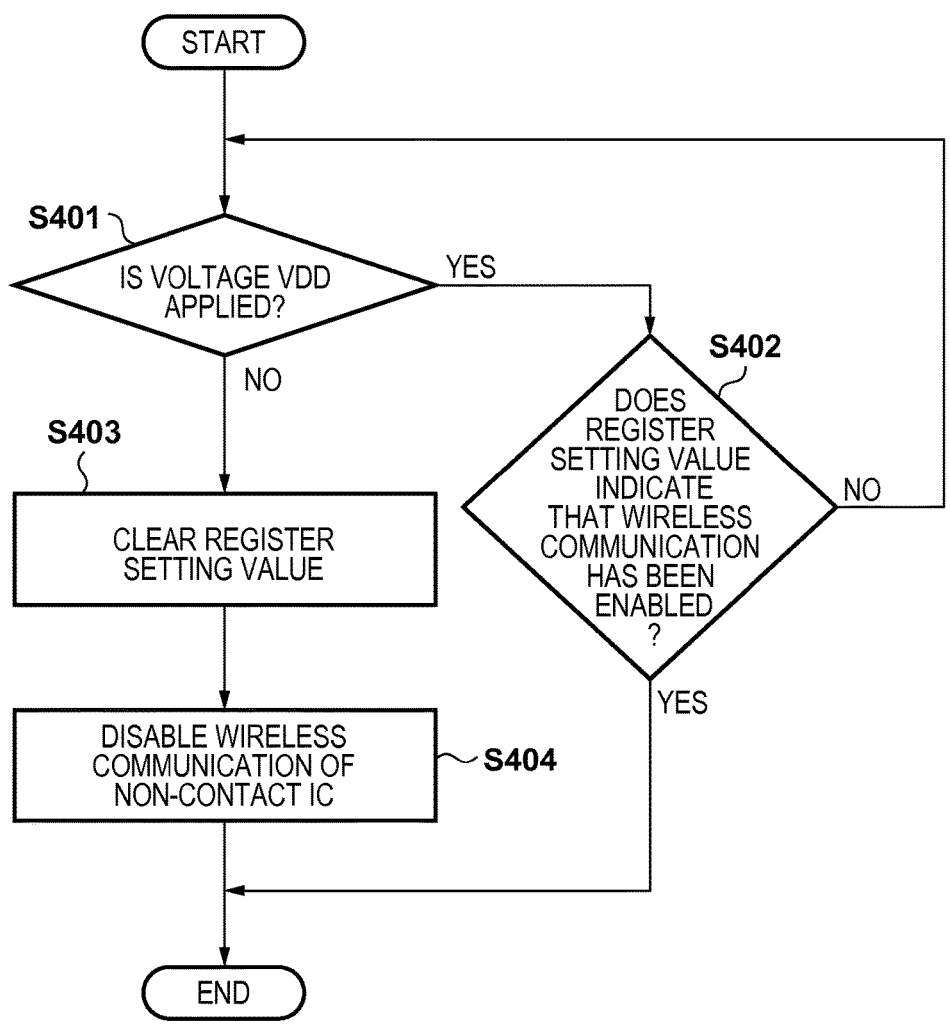
FIG. 4 is a flowchart illustrating an operation procedure by the hardware of the wireless communication apparatus according to the first embodiment.

Processes in steps S401, S402, and S403 are the same as in FIG. 4 and a description thereof will be omitted.

In step S803, the non-contact IC 503 determines whether communication from the external wireless communication apparatus 201 has been performed.

If the non-contact IC 503 determines in step S803 that communication from the external wireless communication apparatus 201 has been performed, the process advances to step S804.

In step S804, the non-contact IC 503 outputs an RF detection signal, thereby terminating the process.

When the RF detection signal is input to the CPU 153, a voltage is output from the VOUT terminal of the power supply IC 152, and the wireless communication apparatus 101 is set in the ON state.

On the other hand, if the non-contact IC 503 determines in step S803 that no communication from the external wireless communication apparatus 201 has been performed, the process stands by for communication.

As described above, in this embodiment, the non-contact IC 503 can respond to the external wireless communication apparatus 201 regardless of whether the power supply voltage VDD is supplied. The initial value of the wireless communication operation of the non-contact IC 503 is "ENABLE".

The CPU 153 can set the wireless communication operation of the non-contact IC 503 to either "DISABLE" or "ENABLE" according to the battery voltage Vbatt of the battery 151.

If the battery voltage Vbatt of the battery 151 is a voltage at which it is impossible to provide a wireless communication operation via the first function, for example, the wireless communication unit 165 of the wireless communication apparatus 501, the CPU 153 can set the wireless communication operation of the non-contact IC 503 to "DISABLE". Alternatively, if the battery voltage Vbatt of the battery 151 is a voltage at which it is possible to provide a wireless communication operation via the first function, for example, the wireless communication unit 165 of the wireless communication apparatus 501, the CPU 153 can set the wireless communication operation of the non-contact IC 503 to "ENABLE".

The CPU 153 sets the wireless communication operation of the non-contact IC 503 to "DISABLE" before turning off the power by performing the shutdown processing of the software of the wireless communication apparatus 501.

According to this embodiment, the non-contact IC 503 does not respond to reception of electromagnetic waves and communication information from the external wireless communication apparatus 201 during a period from when shutdown processing is performed under the control of the software until the power supply voltage VDD of the non-contact IC 503 actually decreases to an inoperable voltage, until the electromagnetic waves are no longer supplied from the external wireless communication apparatus 201. In this case, no RF detection signal is output to the power supply IC 152. As a result, it is possible to prevent a power state in which the power supply IC 152 is driven and the wireless communication apparatus 501 does not reach the power-off state in which reactivation can be performed while the wireless communication apparatus 501 performs the shutdown processing, thereby reducing the consumption of the battery by the operation of the hardware.

Third Embodiment

In the first embodiment, only when the power supply voltage VDD is supplied to the non-contact IC 103, it is possible to perform a wireless communication operation, and the initial value of the wireless communication operation of the non-contact IC 103 is set to "DISABLE". In the second embodiment, the non-contact IC 503 can perform a wireless communication operation by using, as power, the power supply voltage VDD or electromagnetic waves from the outside, and the initial value of the wireless communication operation of the non-contact IC 503 is set to "ENABLE". To the contrary, in the third embodiment, in addition to the function of the non-contact IC according to the second embodiment, it is possible to set the wireless communication operation of a non-contact IC 903 to either "DISABLE" or "ENABLE" by a signal from the outside separately from control via the IC_I/F terminal of the non-contact IC 503.

In the third embodiment as well, assume that wireless communication of the non-contact IC conforms to the international standard ISO/IEC21481, similarly to the aforementioned first and second embodiments.

<Apparatus Configuration>

An overview of the configuration and functions of a wireless communication apparatus according to the third embodiment will be described with reference to FIG. 9.

Figure 9:
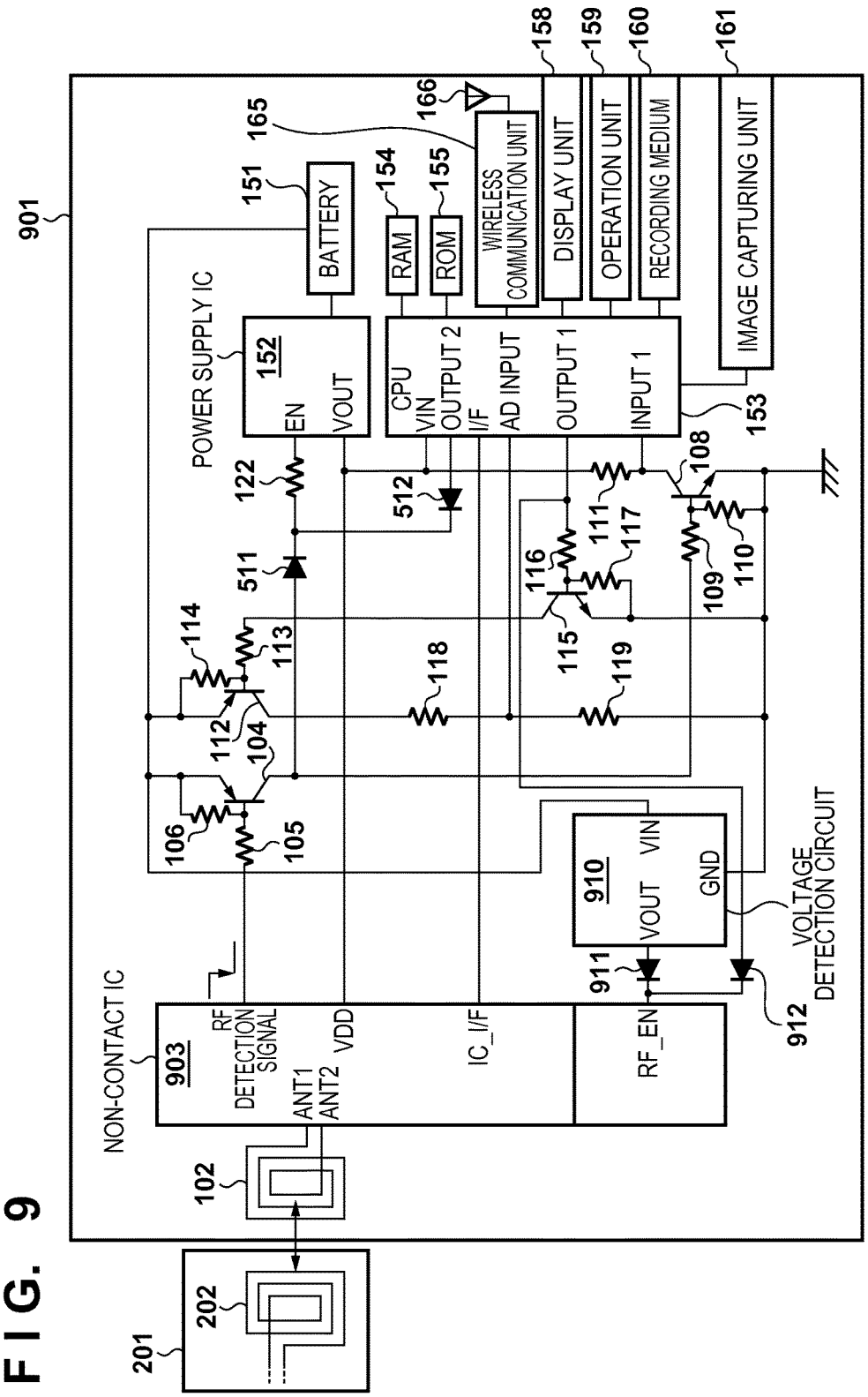
FIG. 9 is a block diagram showing the configuration of a wireless communication apparatus according to the third embodiment.

Note that the same reference numerals as those in FIG. 5 denote the same components in FIG. 9 and the differences from the second embodiment will be mainly described. In a block diagram used for a description of this embodiment, power supply connections to blocks unnecessary for the description of this embodiment are not shown.

Referring to FIG. 9, a voltage detection circuit 910 detects the battery voltage of a battery 151. If the detected batter voltage is lower than a threshold Vt1, the voltage detection circuit 910 outputs low level; otherwise, the voltage detection circuit 910 outputs high level. Since the battery 151 serves as the power supply for the voltage detection circuit 910, the voltage detection circuit 910 functions regardless of the operation of a wireless communication apparatus 901. Assume that the relationship between a lowest operation voltage Vb1 of a power supply IC 152 and the voltage threshold Vt1 of the voltage detection circuit 910 is represented by Vb1<Vt1. Note that the voltage threshold Vt1 of the voltage detection circuit 910 is set to, for example, a voltage value at which the normal operations of various software functions of the wireless communication apparatus 901 are ensured.

A diode 911 is connected from the VOUT terminal of the voltage detection circuit 910 to the RF_EN terminal of the non-contact IC 903, and a diode 912 is connected from output 1 of a CPU 153 to the RF_EN terminal of the non-contact IC 903. RF_EN signals for controlling the wireless communication operation of the non-contact IC 903, which are output from the voltage detection circuit 910 and CPU 153, are ORed and input by the diodes 911 and 912. The operation of the RF_EN signal of the non-contact IC 903 will be described later.

The function of the non-contact IC 903 according to this embodiment is different from that of the non-contact IC 503 according to the second embodiment.

That is, the non-contact IC 503 shown in FIG. 5 has the power supply function of generating power for wireless communication from the electromagnetic waves received by the antenna 102, and can perform wireless communication by using only the electromagnetic waves from the external wireless communication apparatus 201 regardless of whether the power supply voltage VDD is supplied.

To the contrary, the non-contact IC 903 shown in FIG. 9 can set the wireless communication operation of the non-contact IC 903 to either "DISABLE" or "ENABLE" by the RF_EN signal from the outside, in addition to the function of the non-contact IC 503. If the RF_EN signal of the non-contact IC 903 is at low level, the wireless communication operation of the non-contact IC 903 is set to "DISABLE". If the RF_EN signal is at high level, the wireless communication operation of the non-contact IC 903 is set to "ENABLE".

A circuit for setting the wireless communication operation and RN_EN signal of the non-contact IC 903 to "DISABLE" or "ENABLE" may be included as the internal or external circuit of the non-contact IC 903.

In the third embodiment, the initial value of the wireless communication operation of the non-contact IC 903 is "ENABLE", similarly to the second embodiment.

The operations of the peripheral circuits of the non-contact IC 903 will now be explained.

An operation when the non-contact IC 903 receives electromagnetic waves and communication information from an external wireless communication apparatus 201 while the wireless communication apparatus 901 is OFF will be described first.

While the wireless communication apparatus 901 is OFF, the voltage detection circuit 910 detects the battery voltage of the battery 151. If the battery voltage is equal to or higher than the threshold Vt1, the voltage detection circuit 910 outputs high level; otherwise, the voltage detection circuit 910 outputs low level.

If the wireless communication apparatus 901 is OFF and the output of the voltage detection circuit 910 is at low level, the wireless communication operation of the non-contact IC 903 is set to "DISABLE", and thus the non-contact IC 903 does not respond to reception of electromagnetic waves and communication information from the external wireless communication apparatus 201, and nothing occurs.

If the wireless communication apparatus 901 is OFF and the output of the voltage detection circuit 910 is at high level, the wireless communication operation of the non-contact IC 903 is set to "ENABLE", and thus the non-contact IC 903 outputs an RF detection signal upon receiving electromagnetic waves and communication information from the external wireless communication apparatus 201.

The logic of the RF detection signal of the non-contact IC 903 is inverted by the TR 104, and the inverted signal is input to the EN terminal of the power supply IC 152 to drive it. The CPU 153 starts an operation with an output voltage from the VOUT terminal of the power supply IC 152. After the CPU 153 starts the operation, the CPU 153 sets output 2 to high level under the control of software, thereby continuing driving of the power supply IC 152. After the CPU 153 starts the operation, when the CPU 153 sets output 1 to high level under the control of the software, it is possible to set the wireless communication operation of the non-contact IC 903 to "ENABLE" regardless of the operation of the voltage detection circuit 910.

When the RF_EN signal of the non-contact IC 903 is at high level, the CPU 153 can set the wireless communication operation of the non-contact IC 903 to either "DISABLE" or "ENABLE" by making a register setting via the IC_I/F terminal of the non-contact IC 903.

An operation when the non-contact IC 903 receives electromagnetic waves and communication information from the external wireless communication apparatus 201 while the wireless communication apparatus 901 is ON will be described next.

When the wireless communication apparatus 901 is ON, the voltage detection circuit 910 detects the battery voltage of the battery 151, similarly to the case in which the apparatus main body of the wireless communication apparatus 901 is OFF. If the voltage is equal to or higher than the threshold Vt1, the voltage detection circuit 910 outputs high level; otherwise, the voltage detection circuit 910 outputs low level.

If the wireless communication apparatus 901 is ON, the output of the voltage detection circuit 910 is at low level, and output 1 of the CPU 153 is at low level, the wireless communication operation of the non-contact IC 903 is set to "DISABLE". Therefore, the non-contact IC 903 does not respond to reception of electromagnetic waves and communication information from the external wireless communication apparatus 201, and nothing occurs.

If the wireless communication apparatus 901 is ON, the output of the voltage detection circuit 910 is at low level, and output 1 of the CPU 153 is at high level, the wireless communication operation of the non-contact IC 903 is set to "ENABLE". Therefore, upon receiving electromagnetic waves and communication information from the external wireless communication apparatus 201, the non-contact IC 903 outputs an RF detection signal.

The logic of the RF detection signal of the non-contact IC 903 is inverted by the TR 104, further inverted by a TR 108, and then input to input 1 of the CPU 153. By detecting the signal of input 1, the CPU 153 can determine that wireless communication has been performed between the external wireless communication apparatus 201 and the non-contact IC 903.

FIG. 10 shows the truth table for the states of the peripheral circuits of the non-contact IC 903 of the wireless communication apparatus 901 and the wireless communication operation of the non-contact IC 903 according to the third embodiment.

Let Vb1 be the lowest operation voltage of the power supply IC 152. When a battery voltage Vbatt of the battery 151 satisfies 0≤Vbatt<Vb1, the power supply IC 152 cannot operate and thus the CPU 153 is OFF. Since the relationship between the lowest operation voltage Vb1 of the power supply IC 152 and the voltage threshold Vt1 of the voltage detection circuit 910 is represented by Vb1<Vt1, the wireless communication operation of the non-contact IC 903 is set to "DISABLE" according to low level output from the voltage detection circuit 910.

When the battery voltage Vbatt of the battery 151 satisfies Vb1≤Vbatt<Vt1, the power supply IC 152 can operate and thus the CPU 153 can be set in either the ON or OFF state. If the CPU 153 is OFF, the wireless communication operation of the non-contact IC 903 is set to "DISABLE" according to low level output from the voltage detection circuit 910.

On the other hand, if the CPU 153 is ON, the wireless communication operation of the non-contact IC 903 can be set to either "DISABLE" or "ENABLE" under the control of the CPU 153.

When the battery voltage Vbatt of the battery 151 satisfies Vt1≤Vbatt, the power supply IC 152 can operate and thus the CPU 153 can be set in either the ON or OFF state. If the CPU 153 is OFF, the wireless communication operation of the non-contact IC 903 is set to "ENABLE" according to high level output from the voltage detection circuit 910. On the other hand, if the CPU 153 is ON, the wireless communication operation of the non-contact IC 903 can be set to either "DISABLE" or "ENABLE" under the control of the CPU 153.

<Description of Operation>

An operation by the hardware of the non-contact IC 903 of the wireless communication apparatus 901 according to the third embodiment will be described with reference to FIG. 11.

Note that an operation by the software of the non-contact IC 903 of the wireless communication apparatus 901 according to the third embodiment is the same as that shown in FIG. 7 of the second embodiment and a description thereof will be omitted.

Note that when the CPU 153 determines in step S302 whether the battery voltage of the battery 151 is equal to or lower than the threshold, the threshold may be set to a voltage value lower than the threshold of the voltage detection circuit 910.

Since the voltage detection circuit 910 determines a voltage value even in a state in which the software is inactive, it is desirable to set a threshold with a large margin with respect to a voltage value at which the normal operations of various software functions of the wireless communication apparatus 901 are ensured. However, a threshold lower than that of the voltage detection circuit 910 may be set to have a more necessary and sufficient margin with respect to the voltage value at the time of activation of the software.

To set the wireless communication operation of the non-contact IC 903 to "ENABLE" in step S307, the CPU 153 may only control output 1 of the CPU 153 to high level without making a register setting via the IC_I/F terminal of the non-contact IC 903.

The register setting of the non-contact IC 903 is held while the power supply voltage VDD of the non-contact IC 903 is supplied or electromagnetic waves are supplied to the antenna 102, and is cleared when the supply of the power supply voltage VDD or the supply of the electromagnetic waves to the antenna 102 is stopped.

Figure 8:
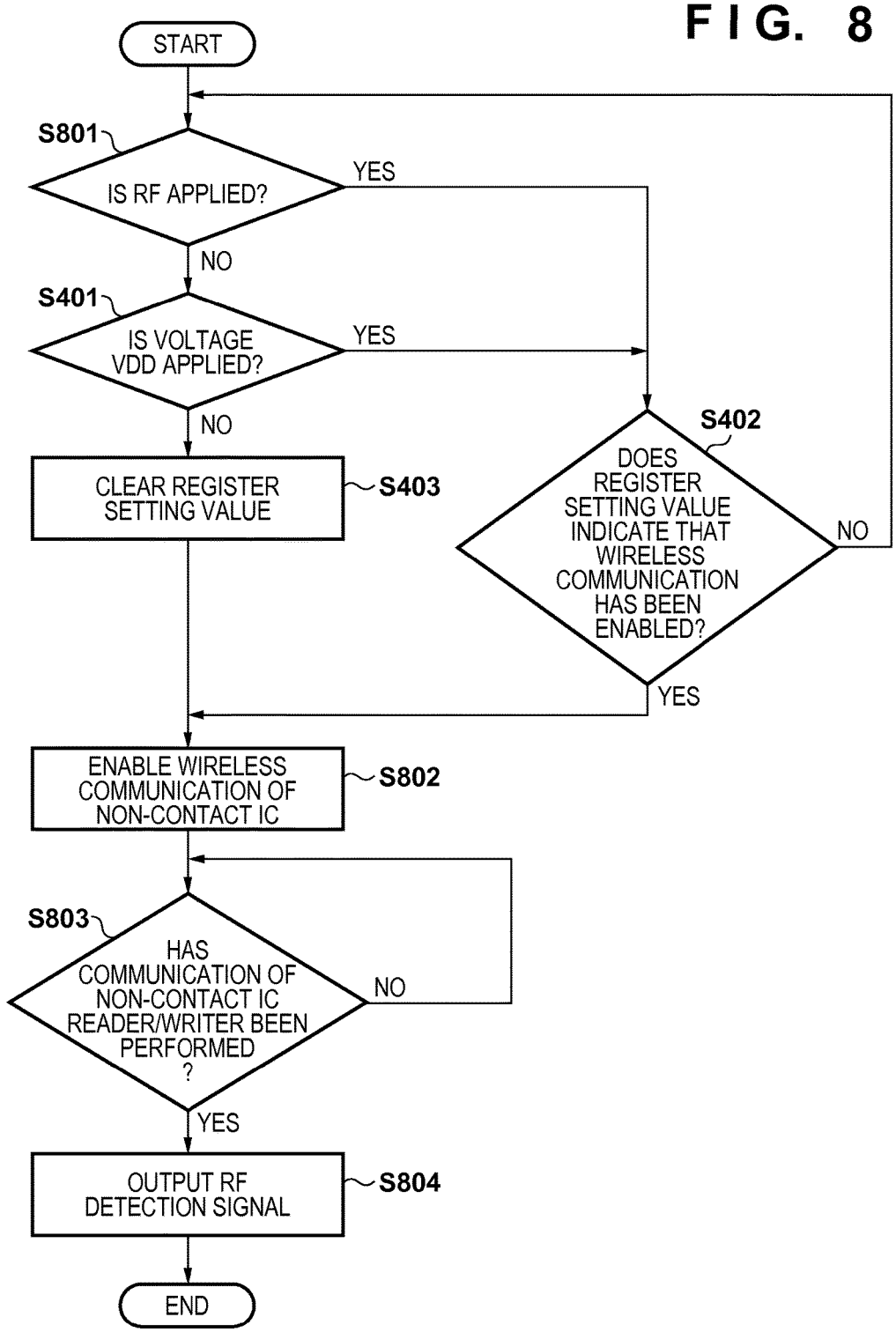
FIG. 8 is a flowchart illustrating an operation procedure by the hardware of the wireless communication apparatus according to the second embodiment.
Figure 11:
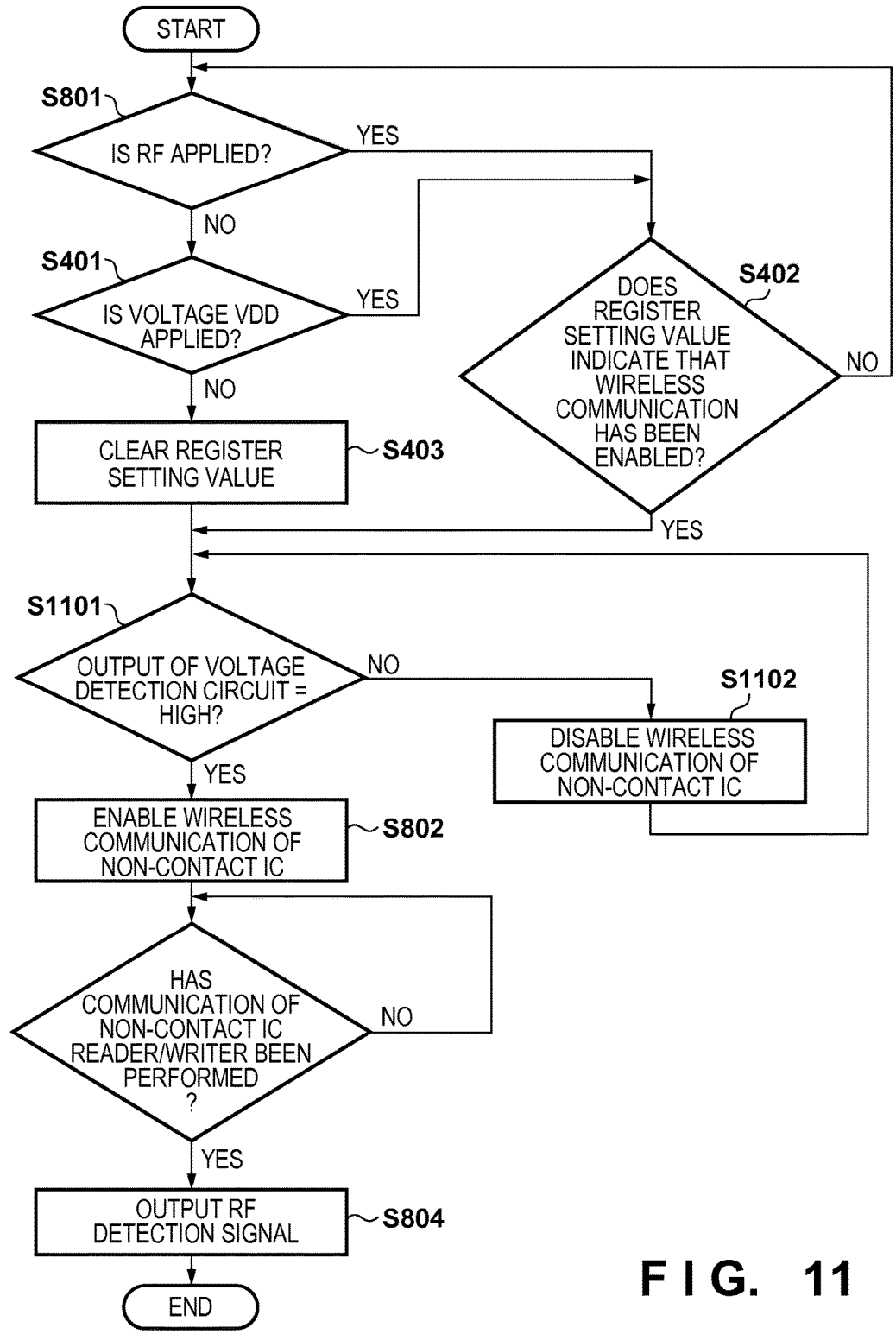
FIG. 11 is a flowchart illustrating an operation procedure by the hardware of the wireless communication apparatus according to the third embodiment.

Referring to FIG. 11, processes in steps S801 to S804 and S401 to S403 are the same as in FIG. 8 and a description thereof will be omitted.

In step S1101, the non-contact IC 903 determines whether the output of the voltage detection circuit 910 is at high level. Note that it may be determined in step S1101 whether the output of the voltage detection circuit 910 is at a predetermined level or lower.

If the non-contact IC 903 determines in step S1101 that the output of the voltage detection circuit 910 is at low level, the process advances to step S1102.

In step S1102, the non-contact IC 903 sets the register setting of the wireless communication operation to "DISABLE".

After the register setting of the wireless communication operation of the non-contact IC 903 is set to "DISABLE" in step S1102, the process returns to step S1101 while maintaining the state in which the non-contact IC 903 cannot perform an operation of responding to reception of electromagnetic waves and communication information from the external wireless communication apparatus 201.

If the non-contact IC 903 determines in step S1101 that the output of the voltage detection circuit 910 is at high level, the process advances to step S802.

As described above, in this embodiment, the non-contact IC 903 can respond to reception of electromagnetic waves and communication information from the external wireless communication apparatus 201 regardless of whether the power supply voltage VDD is supplied.

Although the initial value of the wireless communication operation of the non-contact IC 903 is "ENABLE", it is set to either "DISABLE" or "ENABLE" by detecting the battery voltage Vbatt of the battery 151 by the voltage detection circuit 910.

The CPU 153 can set the wireless communication operation of the non-contact IC 903 to either "DISABLE" or "ENABLE" according to the value of the battery voltage Vbatt of the battery 151.

If the battery voltage Vbatt of the battery 151 is a voltage at which it is impossible to provide a wireless communication operation via the first function, for example, a wireless communication unit 165 of the wireless communication apparatus 901, the CPU 153 can set the wireless communication operation of the non-contact IC 903 to "DISABLE".

If the battery voltage Vbatt of the battery 151 is a voltage at which it is possible to provide a wireless communication operation via the first function, for example, the wireless communication unit 165 of the wireless communication apparatus 901, the CPU 153 can set the wireless communication operation of the non-contact IC 903 to "ENABLE".

The CPU 153 sets the wireless communication operation of the non-contact IC 903 to "DISABLE" before turning off the power by performing the shutdown processing of the software of the wireless communication apparatus 901.

According to this embodiment, the non-contact IC 903 does not respond to reception of electromagnetic waves and communication information from the external wireless communication apparatus 201 during a period from when shutdown processing is performed under the control of the software until the power supply voltage VDD of the non-contact IC 903 decreases to an inoperable voltage, until the supply of the electromagnetic waves from the outside is stopped. With this operation, it is possible to prevent inconsistency of the operation state in which when the wireless communication apparatus 901 is performing shutdown processing but has not reached the power-off state in which reactivation can be performed, the non-contact IC 903 unwantedly responds to reception of electromagnetic waves and communication information from the external wireless communication apparatus 201, thereby reducing the consumption of the battery by the operation of the hardware.

Furthermore, it is possible to prevent inconvenience of the power supply state in which the non-contact IC 903 responds to reception of electromagnetic waves and communication information from the external wireless communication apparatus 201, the power supply IC 152 is driven by the RF detection signal, and the wireless communication apparatus 901 does not reach the power-off state in which reactivation can be performed.

[Modification]

In each of the above-described embodiments, an configuration in which bipolar transistors are used as a signal switch and an element for inverting the logic has been explained as the configuration of the peripheral circuits of the non-contact IC. A switch applicable to this embodiment is not limited to a bipolar transistor. For example, a unipolar transistor such as a FET is also applicable. That is, any element which is rendered conductive upon turning on the switch and is set in a high-impedance state upon turning off the switch is used.

In each of the above-described embodiments, an configuration in which bipolar transistors are used as a signal switch and an element for inverting the logic and a resistor is used as a bias circuit has been explained as the configuration of the peripheral circuits of the non-contact IC. However, a switch and bias circuit applicable to the embodiment are not limited to a bipolar transistor and resistor. For example, a combination of a FET and IC for implementing the same operation is also applicable.

Each of the above-described embodiments assumes that wireless communication of the non-contact IC conforms to the international standard ISO/IEC21481. However, the wireless communication standard of the non-contact IC applicable to this embodiment is not limited to ISO/IEC21481. For example, as long as the non-contact IC operates by using electromagnetic waves from the outside as power, any standard can be applicable to the embodiment. As for the frequency of the electromagnetic waves, instead of 13.56 MHz of ISO/IEC21481, the kHz to GHz frequency band of each part of ISO/IEC18000 is also applicable.

In addition to the above-described embodiments, information indicating whether handover can be currently performed for the wireless communication apparatus 101 may be recorded in the memory of the non-contact IC. In this case, the external wireless communication apparatus 201 can determine whether to execute handover processing, by referring to the information indicating whether handover is possible.

The present invention is not limited to the above-described specific embodiments, and the peripheral circuits and control methods of the above-described embodiments may be combined, as needed. The present invention is applicable as long as the non-contact IC and its peripheral circuits are configured to perform the wireless communication operation of the non-contact IC upon receiving electromagnetic waves and communication information from the outside, and perform a cooperation operation with the functions of the apparatus main body by using the wireless communication operation as a trigger.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-181594, filed Sep. 5, 2014 which is hereby incorporated by reference herein in its entirety.

What is claimed is:

1. A communication apparatus comprising:
a close proximity wireless communication circuit configured to be able to perform close proximity wireless communication with an external apparatus;
at least one processor configured to function as:
a power control unit configured to start control of power supply of the communication apparatus when the close proximity wireless communication circuit receives electromagnetic waves from the external apparatus; and
a control unit configured to execute shutdown processing for reducing power to each block controlled by the power control unit, wherein when the shutdown processing is executed, the control unit disables the close proximity wireless communication circuit before start of the shutdown processing,
wherein when the shutdown processing is complete, the close proximity wireless communication circuit is enabled.

2. The apparatus according to claim 1, wherein the close proximity wireless communication circuit operates using power generated by the electromagnetic waves received from the external apparatus.

3. The apparatus according to claim 1, wherein when the close proximity wireless communication circuit receives the electromagnetic waves from the external apparatus, the close proximity wireless communication circuit transmits a signal to the power control unit, and the power control unit starts control of power supply to each block of the communication apparatus in accordance with the signal from the close proximity wireless communication circuit, and
wherein when the close proximity wireless communication circuit is disabled, even if the electromagnetic waves are received from the external apparatus, the close proximity wireless communication circuit transmits no signal to the power control unit.

4. The apparatus according to claim 1, wherein when the close proximity wireless communication circuit receives the electromagnetic waves from the external apparatus, the close proximity wireless communication circuit transmits a response to the external apparatus, and
wherein when the close proximity wireless communication circuit is disabled, even if the electromagnetic waves are received from the external apparatus, the close proximity wireless communication circuit transmits no response to the external apparatus.

5. The apparatus according to claim 1, wherein the control unit starts the shutdown processing in response to an operation of a power button by a user.

6. The apparatus according to claim 1, wherein when a remaining capacity of a battery becomes not larger than a predetermined amount, the control unit starts the shutdown processing.

7. The apparatus according to claim 1, wherein when a remaining capacity of a battery is not larger than a predetermined amount, even if the shutdown processing is complete, the close proximity wireless communication circuit is not enabled.

8. The apparatus according to claim 1, wherein
the close proximity wireless communication circuit has a recording area for recording information for setting enabling/disabling of the close proximity wireless communication circuit, and information indicating enabling is recorded as an initial value in the recording area,
the control unit controls enabling/disabling of the close proximity wireless communication circuit by recording information in the recording area, and
when power supply to the close proximity wireless communication circuit is stopped, the information recorded in the recording area is reset to the initial value.

9. The apparatus according to claim 1, wherein the at least one processor further functions as a detection unit configured to detect a power supply voltage of the communication apparatus,
wherein the control unit controls to set one of enabling and disabling of an operation of the close proximity wireless communication circuit in accordance with the power supply voltage.

10. The apparatus according to claim 9, wherein
when the power supply voltage is a voltage at which a specific function of the communication apparatus cannot be executed, the control unit controls to disable the operation of the close proximity wireless communication circuit, and
when the power supply voltage is a voltage at which the specific function of the communication apparatus can be executed, the control unit controls to enable the operation of the close proximity wireless communication circuit.

11. The apparatus according to claim 1, further comprising a communication interface different from the close proximity wireless communication circuit,
wherein in accordance with communication of the close proximity wireless communication circuit with the external apparatus, the control unit controls to start processing for establishing communication with the external apparatus by using the communication interface.

12. The apparatus according to claim 1, further comprising an image sensor configured to capture an object and generate image data.

13. A communication apparatus comprising:
a close proximity wireless communication circuit configured to be able to perform close proximity wireless communication with an external apparatus;
at least one processor configured to function as:
a power control unit configured to start power supply processing of the communication apparatus when the close proximity wireless communication circuit receives electromagnetic waves from the external apparatus; and
a control unit configured to execute shutdown processing for reducing power to each block controlled by the power control unit,
wherein the shutdown processing and the power supply processing are not executed at the same time,
wherein when the shutdown processing is complete, the close proximity wireless communication circuit is enabled.

14. The apparatus according to claim 13, wherein the control unit controls the power control unit not to execute the power supply processing when the shutdown processing starts, and controls not to execute the shutdown processing when the power supply processing starts.

15. A control method of a communication apparatus having a close proximity wireless communication unit configured to be able to perform close proximity wireless communication with an external apparatus, the method comprising:
a power control step of starting control of power supply of the communication apparatus when the close proximity wireless communication unit receives electromagnetic waves from the external apparatus; and
a control step of executing shutdown processing for reducing power to each unit controlled in the power control step,
wherein when the shutdown processing is executed, the close proximity wireless communication unit is disabled in the control step before the shutdown processing starts,
wherein when the shutdown processing is complete, the close proximity wireless communication is enabled.

16. A control method of a communication apparatus having a close proximity wireless communication unit configured to be able to perform close proximity wireless communication with an external apparatus, the method comprising:
a power control step of starting power supply processing of the communication apparatus when the close proximity wireless communication unit receives electromagnetic waves from the external apparatus; and
a control step of executing shutdown processing for reducing power to each block controlled in the power control step,
wherein the shutdown processing and the power supply processing are not executed at the same time,
wherein when the shutdown processing is complete, the close proximity wireless communication unit is enabled.

17. A non-transitory computer-readable storage medium which stores a program for causing a computer to execute a method, the method comprising:
a power control step of starting control of power supply of the communication apparatus when the close proximity wireless communication unit receives electromagnetic waves from the external apparatus; and
a control step of executing shutdown processing for reducing power to each unit controlled in the power control step,
wherein when the shutdown processing is executed, the close proximity wireless communication unit is disabled in the control step before the shutdown processing starts,
wherein when the shutdown processing is complete, the close proximity wireless communication unit is enabled.

18. A non-transitory computer-readable storage medium which stores a program for causing a computer to execute a method, the method comprising:
a power control step of starting power supply processing of the communication apparatus when the close proximity wireless communication unit receives electromagnetic waves from the external apparatus; and
a control step of executing shutdown processing for reducing power to each block controlled in the power control step,
wherein the shutdown processing and the power supply processing are not executed at the same time,
wherein when the shutdown processing is complete, the close proximity wireless communication unit is enabled.

* * * * *